US012009578B2

(12) United States Patent
Finegold

(10) Patent No.: US 12,009,578 B2
(45) **Date of Patent: *Jun. 11, 2024**

(54) RADIO FREQUENCY EMISSION GUARD FOR PORTABLE WIRELESS ELECTRONIC DEVICE

(71) Applicant: Erin Finegold, San Diego, CA (US)

(72) Inventor: Erin Finegold, San Diego, CA (US)

(73) Assignee: Stingray Shields Corporation, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/180,334

(22) Filed: Mar. 8, 2023

(65) Prior Publication Data

US 2023/0291093 A1 Sep. 14, 2023

Related U.S. Application Data

(63) Continuation of application No. 17/504,448, filed on Oct. 18, 2021, now Pat. No. 11,605,880, which is a continuation of application No. 15/701,370, filed on Sep. 11, 2017, now Pat. No. 11,152,687, which is a continuation-in-part of application No. 14/089,751, filed on Nov. 25, 2013, now Pat. No. 9,761,930.

(60) Provisional application No. 61/729,589, filed on Nov. 24, 2012.

(51) Int. Cl.

| | |
|---|---|
| ***H01Q 1/52*** | (2006.01) |
| ***H01Q 1/00*** | (2006.01) |
| ***H01Q 1/24*** | (2006.01) |
| ***H01Q 1/40*** | (2006.01) |

(52) U.S. Cl.
CPC ............. *H01Q 1/245* (2013.01); *H01Q 1/002* (2013.01); *H01Q 1/40* (2013.01); *H01Q 1/526* (2013.01)

(58) Field of Classification Search
CPC .............................. H01Q 1/245; H04B 1/3838
See application file for complete search history.

(56) References Cited

U.S. PATENT DOCUMENTS

| | | | | |
|---|---|---|---|---|
| 9,761,930 | B2 | 9/2017 | Finegold | |
| 11,152,687 | B2 * | 10/2021 | Finegold | H01Q 1/002 |
| 11,605,880 | B2 * | 3/2023 | Finegold | H01Q 21/29 |
| 2002/0009976 | A1 | 1/2002 | Rashidi | |
| 2004/0160378 | A1 | 8/2004 | Abrams et al. | |
| 2005/0088345 | A1 * | 4/2005 | De La Torre Barreiro | H01Q 1/245 343/702 |
| 2006/0139216 | A1 | 6/2006 | Glocker | |
| 2010/0113111 | A1 | 5/2010 | Wong et al. | |
| 2010/0234081 | A1 | 9/2010 | Wong et al. | |
| 2012/0044115 | A1 | 2/2012 | McCaughey et al. | |
| 2013/0035142 | A1 | 2/2013 | Wolf, II | |

* cited by examiner

*Primary Examiner* — Daniel Munoz
(74) *Attorney, Agent, or Firm* — Gary L. Eastman, Esq.; Eastman IP

(57) ABSTRACT

A radio frequency and electromagnetic emission shield employed on wireless personal and portable electronic devices, containing one or more layers of radio frequency (RF) or electromagnetic (EM) screening material, shielding the user from harmful RF or EM radiation, or a redirection antenna that receives all RF signals, and redirects those signals away from the user. The RF emission shield may be contained within a plurality of outer layers, providing a secure fit to a wireless electronic device and an outer layer providing an easy grip for the user.

12 Claims, 9 Drawing Sheets

RADIO FREQUENCY EMISSION GUARD FOR PORTABLE WIRELESS ELECTRONIC DEVICE

RELATED APPLICATION

The present invention is a continuation application of U.S. patent application Ser. No. 17/504,448, filed on Oct. 18, 2021, entitled "Radio Frequency Emission Guard For Portable Wireless Electronic Device," and currently co-pending, which is a continuation application of U.S. patent application Ser. No. 15/710,370 filed Sep. 11, 2017, entitled "Radio Frequency Emission Guard For Portable Wireless Electronic Device," now U.S. Pat. No. 11,152,687, which is a continuation-in-part patent application of U.S. patent application Ser. No. 14/089,751 filed on Nov. 25, 2013 now U.S. Pat. No. 9,761,930 and entitled "Radio Frequency Emission Guard for Portable Wireless Electronic Device," which claims the benefit of priority to U.S. Provisional Application Ser. No. 61/729,589. The above-mentioned related applications are incorporated herein by reference.

FIELD OF THE INVENTION

The present invention relates generally to portable wireless personal electronics and minimizing harmful electromagnetic emissions from wireless electronic devices. The present invention is more particularly, though not exclusively, a thin, cover or case, made of a specialized flexible material that may be placed on the surface of a cellular phone or other portable electronic device to minimize the harmful effects of electromagnetic emissions on the device user.

BACKGROUND OF THE INVENTION

Smartphones, tablets, and other wireless devices have become the individual's permanent link to the Internet, which is for most, the central hub for daily business, communication, and entertainment. Most electronic devices have migrated toward a wireless model, incorporating cellular, radiofrequency (RF), BlueTooth™, and wireless fidelity (WiFi) transmissions, to name but a few, into their architecture. This combined with the already ubiquitous radio and microwave towers in our cities and neighborhoods have resulted in a modern world of manmade electromagnetic radiation to which we are all constantly exposed. Every time a person makes a call, downloads an email, or sends a text message with a portable device, that person experiences a burst of low-level electromagnetic radiation often immediately adjacent to the body. This periodic irradiation persists as long as one carries a wireless device in a pocket, or holds it in their lap or to his or her ear.

While the term radiation is often associated with "nuclear radiation" or "radioactivity," the word "radiation," particularly in this sense, refers to energy radiating from a source; not necessarily to radioactivity.

Each of the aforementioned transmission protocols operate in an RF band and fall somewhere in the electromagnetic spectrum. Such an RF transmission, or radiation, is the subject of ongoing debate regarding the harmful effects that electromagnetic radiation has on the human body. While the majority of major RF hazards surround occupational hazards such as RF shocks and burns from high-powered antennae, many experts believe that exposure to low-level electromagnetic radiation for long periods of time can result in other harmful effects such as cancer.

Electromagnetic ("EM") radiation consists of electric and magnetic energy moving together, or radiating, at the speed of light. Radio waves, microwaves, two-way radios, or any signal or energy emitted via an antenna, falls somewhere on the EM spectrum. Ordinarily, EM field, or RF field are terms used to express the presence of some level of EM energy.

On the lower frequency, yet longer wavelength end of the EM spectrum, past visible light, are infrared, RF, and microwave radiation. The latter two, RF and microwave, are the backbone of the vast majority of wireless communications and will be referred to collectively as "RF."

The RF part of the electromagnetic spectrum is generally defined as that part of the spectrum where electromagnetic waves have frequencies in the range of about 3 kilohertz (3 kHz) to 300 gigahertz (300 GHz). This includes the microwave subcategory, usually regarded as electromagnetic radiation in the 1-170 GHz range.

Electromagnetic radiation results in a physical field produced by moving electrically charged particles, known as an electromagnetic field ("EMF"). The EMF that surrounds electronic devices is produced by electrical conductors and alternating currents. EMF, or at least its RF component, is usually measured in terms of frequency, or Hertz (Hz).

Most high-powered radars and large commercial RF antennae are capable of producing a large EMF with enough energy to change substances on a molecular level by way of ionization. Damage caused by this level of electromagnetic radiation is most often characterized by heating of the human body to the point of "electrostimulation," or shocks and burns. In extreme cases, ionizing radiation interrupts regular human cellular operation, and often causes the destruction of molecular compositions within cells, possibly resulting in cellular mutations and some forms of cancer.

However, the various portable electronic devices ordinarily employed for personal use do not contain sufficient energy to chemically change substances by ionization, and so is an example of "nonionizing" radiation. However, there have been several studies that suggest long-term exposure to nonionizing electromagnetic radiation, including RF and microwaves, have significant adverse biological effects at low levels. Such energy may have a carcinogenic effect. This is separate from the risks associated with very high intensity exposure, which can cause burns, and not a unique property of the microwave or RF radiation coming from a portable electronic device.

The radiation to which we are exposed—and the associated affects—depends heavily on the frequency, power, and direction of the emitted energy. Antenna transmission paths are described as either directional or omnidirectional. Omnidirectional antennae receive or radiate more or less in all directions. Most mobile systems, such as personal electronics, employ omnidirectional antennae because the relative position of a cellular station or transmission antenna is unknown or arbitrary. They are also used at lower frequencies where a directional antenna would be too large, or to simply cut costs in applications where a directional antenna is not required. Directional or beam antennae are intended to preferentially radiate or receive in a particular direction or directional pattern. Most cellular towers employ this kind of antenna so as to concentrate the energy in specific areas, or lobes, in order to maximize output in specific areas. For instance, most cellular users are on the ground or at least a lower elevation than the towers, thus such transmission paths are directed predominantly down, instead of up into the atmosphere where the energy goes unused.

Similarly, portable wireless devices, such as tablet personal computers (tablet PCs) or smartphones like the Apple™ iPad™ or iPhone™ or countless others operate on multiple frequencies enabling the systems to connect multiple networks via cellular signals, WiFi, or Bluetooth™, among others. These transmissions are often omnidirectional, transmitted from the antennae in all directions, as the location of a cellular tower is often unknown to the user. This leaves little protection for the user from the EM and RF radiation. Moreover, generally the closer the user is the device's antenna, the more radiated energy that person absorbs.

Power radiated from an antenna decreases logarithmically with distance (d) and wavelength (A). This phenomenon is known as path loss. Path loss takes into consideration propagation losses caused by the natural expansion of the radio wave front in free space, absorption losses to media not transparent to EM waves, and diffraction losses when part of the radio wave front is obstructed. Path loss is ordinarily used to describe the losses over large distances but it is also useful to describe the loss over short distances such as the approximately 20 cm between the typical user and his or her wireless electronic device versus the person sitting with an iPad in his or her lap. Because the power of radiated EM energy decreases exponentially with the distance (d2) between the antenna and the user, the closer one is to the radiated energy, the more affect the energy will have.

For instance, a user with a tablet PC in his or her lap or a smartphone to the ear is bombarded with the full power of the antenna's signal directed at the body, as the system communicates with a network or networks. Similarly, a user sitting with a tablet PC, such as an iPad™, while watching a movie or checking email is receiving the full power of the radiated signal to his or her legs, only a fraction of the radiated power reaches the user's face, due to the distance and propagation loss.

While research and debate continue over low-level effects, efforts are continually made to shield ourselves and our electronic systems from EMI, though few of those efforts have been made to shield ourselves from the radiation we experience from our own personal wireless electronic devices.

Shielding can be a double-edged sword however. On one hand, shielding offers the desired protection from unwanted EM or RF radiation, but at the same time the phone must still transmit a signal in order to provide the desired connection to the particular network. Too much shielding negatively affects the phone's ability to provide functionality due to the limited ability to transmit and receive signals. Too little, and the user does not receive the desired shielding.

In light of the above, it would be advantageous to develop a lightweight, low cost, customizable, and convenient material that shields the individual from the harmful effects of the electromagnetic radiation from their our own electronic devices while simultaneously maximizing required transmissions to and from the device. It would be further advantageous to provide a device which collects specific radiation from an electronic device, and redirects that radiation away from the user thereby decreasing the exposure to the user.

SUMMARY OF THE INVENTION

The present invention is an electromagnetic shielding case for wireless electronic devices, developed in effort to achieve a significant degree of reduction in electromagnetic (EM) and radio frequency (RF) radiation directed at the user of such a device.

While it is not possible or practical to completely shield all EM radiation from our devices, as that would negate their primary utility as mobile wireless devices, the present invention presents a radio frequency emission guard for wireless electronic devices, constructed of two primary materials, in various configurations that optimize the functionality of a given electronic device while providing maximum protection to the user from EM and RF radiation not directed toward an antenna, but at the user.

The most common cellular systems in use today are the 3G (3rd Generation), 4G (4th Generation), and Global System for Mobile Communications (GSM) protocols, while the vast majority of wireless internet transmissions are via the IEEE 802.11 WiFi standard and the emerging IEEE 802.16 WiMAX standard. Each system has a variety of frequencies upon which they transmit signals. Most cellular signals span the range from about 700 MHz to 3 GHz, with both 3G and 4G signals in approximately the 700-800 MHz and 1,850-2,690 MHz ranges while GSM operates in a slightly different 800-900 MHz, and 1,850-2,000 MHz. These are approximate ranges, and the primary signals to which the present invention is directed, though effective for the majority of the EM and RF spectrum providing at least some shielding from approximately 500 MHz to 18 GHz. At the same time, the present invention provides several electronic device case design options that maximize transmission while minimizing EM radiation on the user.

The first material used in the present invention, commonly referred to in the industry as "Porcupine," is a metalastic mesh, constructed of expanded monel metal alloy foil, that is filled with a silicone or fluorosilicone elastomer, while the second is a fine copper mesh, constructed out of fine, knitted wire mesh with approximately 100 openings per inch ("OPI"). Both materials have been clinically proven to deliver significant reduction in EM and RF energy, and are most often used in electromagnetic interference ("EMI") shielding gaskets. In some cases, both materials have been shown to offer nearly complete shielding of emitted RF and EM energy. The number of OPI directly affects the shielding characteristics of the material employed. Typically, the more OPI, the higher the shielding will be for higher-frequency EMF, whereas fewer OPI will be more effective against lower-frequency EMF The shielding effectiveness may also be modified through the application of multiple layers, coatings over the metal, and different designs or mesh patterns.

Commercially, monel mesh is primarily used in a "filled" or "unfilled" form, as a gasket for sealing an electronic enclosure. Such a gasket, for instance, provides electrical continuity from the edge of an access panel to the rest enclosure in order to prevent transmission of electromagnetic interference into or out of the space. In application for the present invention however, both materials are employed as a screen as opposed to a gasket, best employed on the back of a portable electronic device, e.g., in a protective case for the device. In use, a case made of such expanded monel mesh or the fine wire mesh material insulates the user's body from radiation from the back of the device. A preferred embodiment of the present invention is configured as a case with the shielding layer made of one of the various configurations of the two proposed materials. The shielding layer is sandwiched between or embedded within a protective layer that fits snugly against the form of the wireless electronic device, and an outer layer delivering an ergonomic or slip-resistant surface for the user to hold. Alternative embodiments further include additional provisions for external accessories and additional layers of adhesives providing a secure construction.

One embodiment of the present invention is employed where the user is watching a movie on an iPad™ in his or her lap. Additionally, as many parents give their children an iPad or similar device on a long trip to watch a movie or play games, the present invention also will protect small children from any harmful effects of the EMF coming from the devices. The material shields the user's body from the EMF created by the device, while the cut and design of the case itself allows the device to send and receive transmissions with a particular system, optimizing available transmission paths.

Another embodiment may employ an additional, transparent portion, allowing for the inclusion of graphics, denoting the trademark of the manufacturer or other design. The transparent portions may be composed of a transparent film, such as plastics, glass, or a type of polycarbonate. Such a transparent layer can further include the same or similar shielding characteristics, and can have light transmission capacities of up to 99 percent.

When the device is not in use, the case may be used to insulate, or shield cellular or WiFi transmissions emitted by the electronic device, while also preventing intrusion from outside signals.

As a result, the present invention provides significant reduction in, and in some cases nearly complete protection from the EM and RF radiation the user experiences, while the system itself suffers no reduction in performance.

An additional embodiment of the present invention includes a radiation signal receiving antenna electromagnetically coupled to a re-transmitting antenna to direct the necessary electromagnetic signals away from the user while still providing optimum use of the portable electronic device.

BRIEF DESCRIPTION OF THE DRAWINGS

The objects, features, and advantages of the method according to the invention will be more clearly perceived from the following detailed description, when read in conjunction with the accompanying drawing, in which.

DETAILED DESCRIPTION

The present invention provides a means to reduce the effects of the electromagnetic (EM) energy radiated from a portable wireless electronic device on the user, while maximizing the device's utility and functionality. The reduced EM field (EMF) and radio frequency (RF) energy experienced by the user resulting from the use of a wireless electronic device with the present invention installed decreases the potential for health problems caused by EM or RF energy on the person.

Figure 1:
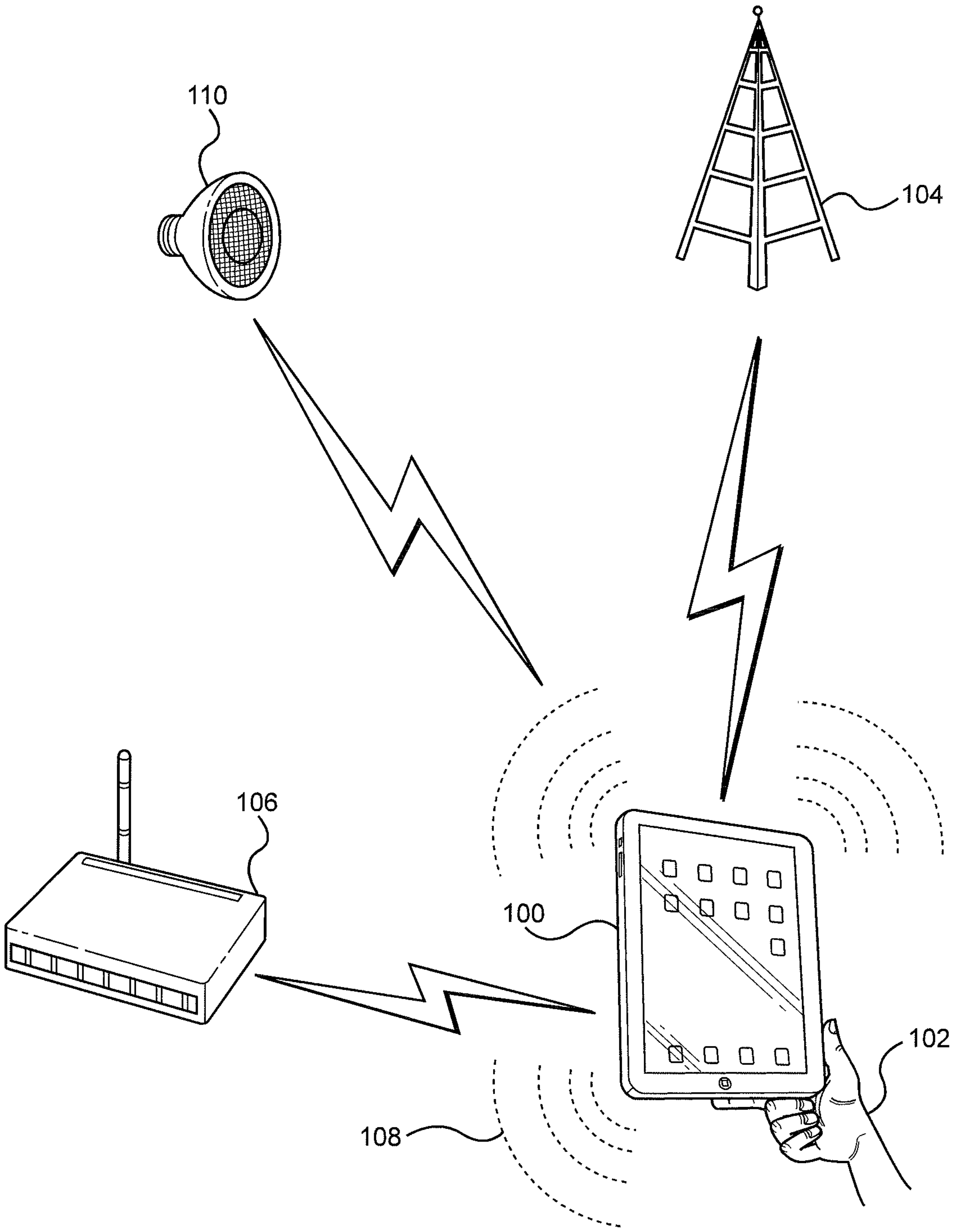
FIG. 1, is a system level diagram showing the end user with a portable electronic device, without the present invention installed, in radio frequency communication with a cellular tower, in addition to a WiFi hotspot and a Bluetooth™ device, and line representations of the electromagnetic fields of each and their interaction with the end user.

Referring initially to FIG. 1, an overall system diagram is shown, depicting a wireless electronic device 100 employed by user **1*n*2. Wireless electronic device 100 is further in RF communication with exemplary cellular tower 104 on a designated system such as GSM, 3G, 4G, or similar networks, in addition to RF communication with exemplary Wi-Fi hub 106 on a separate RF signal, such as IEEE standard 802.11 or 802.16 WiMAX, and Bluetooth™ system 110**, such as an external speaker. The listed WiFi, cellular, and Bluetooth™ networks listed are exemplary and should not be considered limiting by those skilled in the art.

In this Figure, user 102 is experiencing the EMF 108 radiated from wireless electronic device 100 on a number of RF channels in use by device 100, while device 100 communicates with cellular tower 104, WiFi hub 106, and Bluetooth™ speaker 110.

Figure 2:
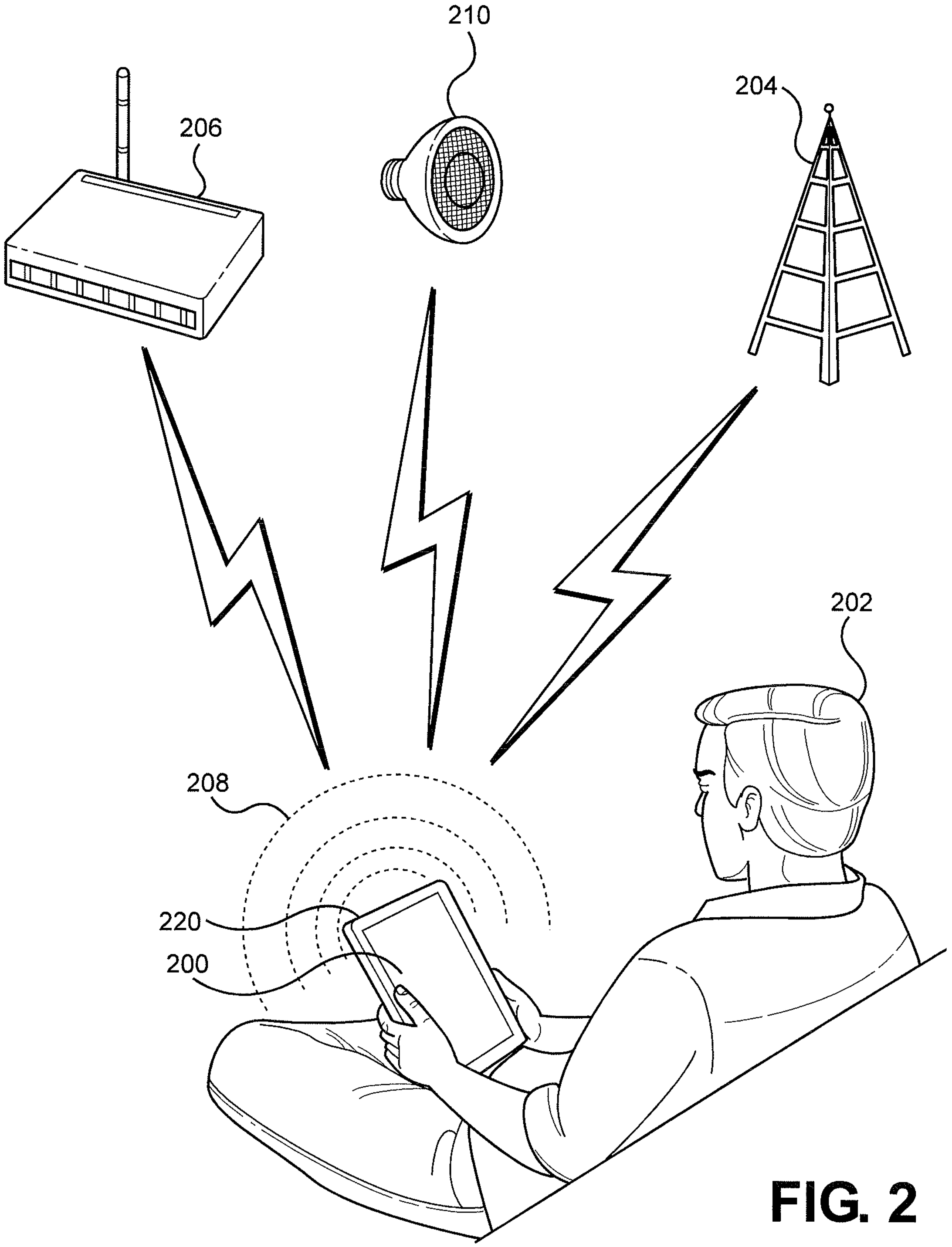
FIG. 2, is a system level diagram showing the end user with a portable electronic device, with the present invention installed, in radio frequency communication with a cellular tower, in addition to a WiFi hotspot and a Bluetooth™ device, and line representations of the diminished electromagnetic field of the portable electronic device.

FIG. 2 shows an overall system diagram, similar to FIG. 1, depicting user 202 seated, holding wireless electronic device 200 with the radio frequency emission guard for portable wireless electronic device ("EMF shield") 220 of the present invention installed on the back of device 200, as wireless electronic device 200 communicates with cellular tower 204, WiFi hub 206, and Bluetooth™ speaker 210. In this Figure, the amount of EMF 208 experienced by user 202 is significantly reduced due to the RF and EM shielding properties of EMF shield 220. In particular, the EMF shield 220 installed on the rear surface of device 200 prevents the majority of energy from negatively affecting user 202, while seated with device 200 in his or her lap. While EMF 208 is blocked from radiating from the rear of device 200, some EMF 208 is still transmitted through other parts of the device 200 not covered, providing functionality of the system.

Figure 3:
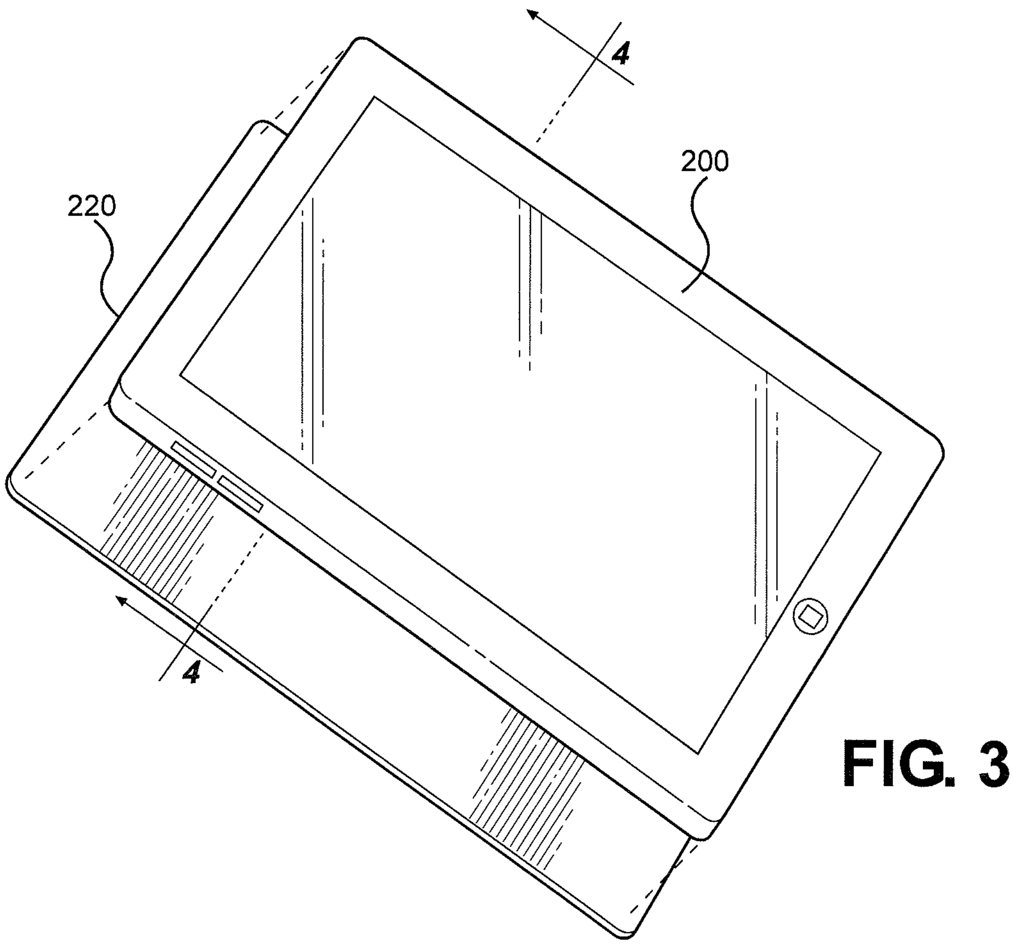
FIG. 3, is an exploded, isometric view of a tablet personal computer with a preferred embodiment of the present invention installed.

FIG. 3 shows an exploded view of the preferred embodiment of EMF shield 220, as installed on device 200. As shown, EMF shield 220 attaches to the back of device 200. In an embodiment, EMF shield 220 is formed such that the sides of EMF shield 220 wrap around the edges of device 200 holding EMF shield 220 in place. In an alternative embodiment, an adhesive layer holds EMF shield in place, providing a lower-profile design. Both system configurations provide an effective shield against EMF 208 for user 202.

Figure 4:
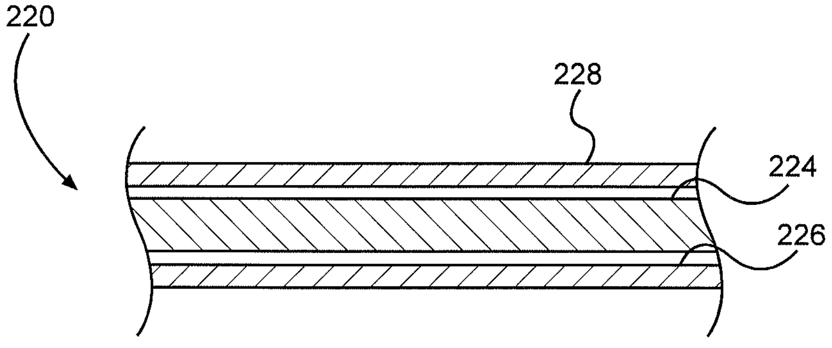
FIG. 4 is an exploded, cross sectional view of the construction of a preferred embodiment of EMF shield of FIG. 3, showing exemplary outer, shield, and inner layers.

FIG. 4 shows a close up, cross sectional view on line 4-4 of FIG. 3, of the construction of a preferred embodiment of EMF shield 220 is shown. In this Figure, EMF shield 220 is formed from multiple layers, including the shield layer 224, outer layer 226, and inner layer 228. Outer layer 226 is intended to provide a secure gripping area for the user 202, thus it may be formed from various substrates known for their gripping properties, such as rubber, leather, or other ergonomic or non-slip coatings. Inner layer 228 provides a snug, yet protective layer for device 200. Inner layer 228 maintains a fit around the edges of device 200, and keeps shield layer 224 in place. It is to be appreciated by those skilled in the art that the three layers depicted in this Figure are exemplary and should not be seen as limiting, as multiple layers of shielding or additional layers such as adhesives may be required for the construction of alternative embodiments.

In a preferred embodiment, shield layer 224 is formed out of unfilled monel ("Porcupine") mesh. "Monel" is the commercial brand name for a set of alloys based on nickel (65-70%) and copper (20-29%) and also contains iron and manganese (5%) and other compounds. A rugged nickel-copper alloy with high strength and excellent corrosion resistance in a range of harsh environments, monel is commonly found in marine applications as well as EM resistant gaskets. "Unfilled" monel refers to the fact that there is no elastomeric polymer embedded in the expanded monel mesh. Instead, shield layer 224 is surrounded by the inner layer 228 and the outer layer 226.

In a preferred embodiment, shield layer 224 of EMF shield 220 may alternatively be constructed of multiple layers of unfilled monel, or other similar materials used for RF and EM shielding such as copper mesh. These various configurations of shield layer 224 may be embedded within the outer layer 226 or inner layer 228 of the case or constructed as separate layers.

Porcupine and copper mesh were selected for the preferred embodiment due to their availability and shielding characteristics. While commonly used in RF and EM gaskets as "filled" monel, no commercial use of such a product has been made with wireless electronic devices. In various clinical experiments, both the Porcupine and the fine mesh materials were shown to significantly reduce and in some cases, effectively block the vast majority of radiated power experienced by the receiver, modeling a user 202, when placed between the antenna of wireless electronic device 200 and the receiver. In testing, an Apple™ iPhone and an iPad were both tested for radiated power without any case or screen, and subsequently with both the Porcupine and the fine mesh used in multiple configurations as an EM shield 220. A double layer of Porcupine (unfilled monel) was also tested. The device-to-receiver distances used were 20 cm, modeling the approximate distance between the device 200 and the user's 202 face in use, and 0.5 inches, modeling the distance between the device 200 and the user's 202 lap.

The frequencies tested, 832 MHz, 1867.1 MHz, 1892.3 MHz, and 2430 MHz correspond to the primary transmission frequencies of the Apple iPad™ and iPhone™ The frequencies 832, 1867.1, and 1892.3 MHz are the 3G and 4G cellular frequencies providing telephonic and data services through a specific network (e.g., AT&T™ or Verizon™) while the 2430 MHz is the WiFi and Bluetooth™ connection frequency.

The test results for the 20 cm distance showed that a single layer of the unfilled monel mesh (Porcupine) used as an EMF shield 220 between the device and an RF receiver reduced the received signal by up to 85%, while the double Porcupine layer reduced the received signal by over 95%. For this phase of the testing, the results varied based on frequency, using 832 MHz (39.7% single/70.5% double layer), 1867.1 MHz (85.1% single/95.8% double layer), 1892.3 MHz (53.2% single/89.0% double layer), and 2430 MHz (59.3% single/70.5% double layer). 2430 MHz represents the frequency for the IEEE 802.11 standard for Wi-Fi transmission.

The fine mesh results were also compelling, with no less than a 90% reduction in signal strength (832 MHz: 91.1%; 1867.1 MHz: 91.1%; and 2430 MHz: 94.5%). The 1892.0 MHz was not tested because the difference between 1892.0 MHz and 1867.1 MHz was statistically insignificant. Each of the numbers shown in parentheses above refers to the percent reduction in signal strength from transmission to receipt though the shielding layer 224.

The test was repeated for the 0.5 inch separation between EMF shield 220 and user 202 with dramatic results, offering a nearly 100% reduction in signal strength in for the 832 MHz signal and no less than 70% for any of the other signals with the three iterations of the test using single-layer Porcupine, double-layer Porcupine, and fine mesh as the shielding material. The 0.5 inch test was performed to show effective radiated power losses at the four frequencies at an orientation consistent with the device lying on one's lap.

These clinical tests showed that overall, the three configurations of the materials utilized as shielding layer 224 (single Porcupine, double Porcupine, and fine mesh) provided a partial shield for transmission, but significant reduction in emitted signal strength where the screens were applied, while the devices themselves suffered no reduction in performance. This is due to the antennae's 112 ability to transmit in other directions, opposite EMF shield 220. While a complete, i.e., one hundred percent shield for the emitted frequencies may not be a possible or even practical solution, the present invention provides a significant reduction in the radiated energy, protecting the user 202.

Figure 7:
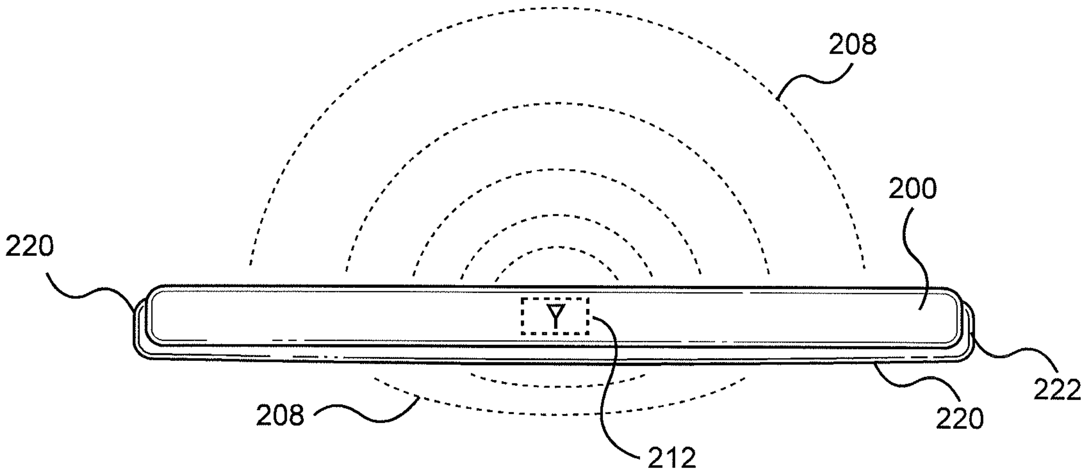
FIG. 7 is a cross sectional view of a tablet PC with the preferred embodiment of FIG. 3 installed, showing an approximation of the diminished electromagnetic field emanating from the antenna of the portable electronic device.

In an alternative embodiment, outer layer 226 may be replaced by other substrates, providing similar grip characteristics, or mounting points for device 200 accessories, such as clips for pockets or belts, or storage of earphones. Such alternative embodiments may make use of an adhesive inner layer in place of inner layer 228, eliminating the requirement that EMF shield 220 have curved edges to secure to device 200, as shown in FIG. 7.

In an alternative embodiment, portions of the outer layer 226 may be replaced with transparent materials, creating a design or outline. Various transparent materials such as a plastic film, glass, or polycarbonate that have been impregnated or coated with materials such as the fine copper mesh, have also been clinically shown to provide EM shielding properties, often as high as the monel and copper mesh. Even with the shielding characteristics, the same materials are often 99% transparent. As such, portions of the outer layer 228 may be replaced with such a transparent material, revealing either the back of the device 100 itself, or revealing portions of the shield layer 224, providing an aesthetic appeal.

Similarly, in another alternative embodiment, inner layer 228 is formed of a scratch resistant material, preventing wear or abrasion of the surface of device 200. This characteristic may be combined with the curved edges 222.

Figure 5:
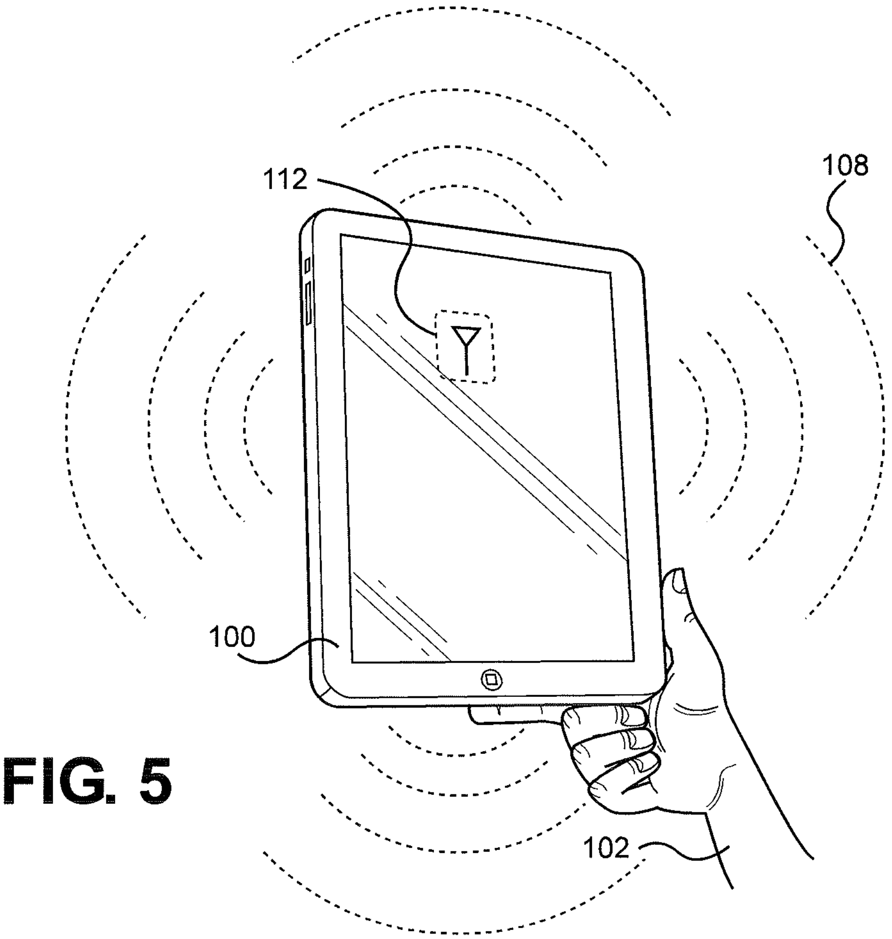
FIG. 5 is a plan view of a two dimensional approximation of the electromagnetic field emanating from a portable electronic device without the present invention installed.

Referring now to FIG. 5, a plan view of device 100 is again shown, as held by user 102, showing EMF 108 radiating outward from the internal antenna 112, shown within dashed lines. Antenna 112 is depicted as being built into the center of device 100, as is the case with an Apple iPad™. It is to be understood by those skilled in the art that the location of antenna 112 within device 100 is not to be considered limiting, as other similar tablet devices may have a slightly different antenna 112 locations. This aspect is considered in later Figures.

In this Figure, device 100 is unshielded, and thus EMF 108 radiates in all directions, including directions that provide neither useful signal to another device 100 nor useful response to network communications. The additional EMF 108 that is not part of the direct communication with cellular tower 104, WiFi 106, or Bluetooth™ 110 is often directed at the user 102, presenting an EM hazard. This is the EMF 108 the present invention seeks to limit.

Figure 6:
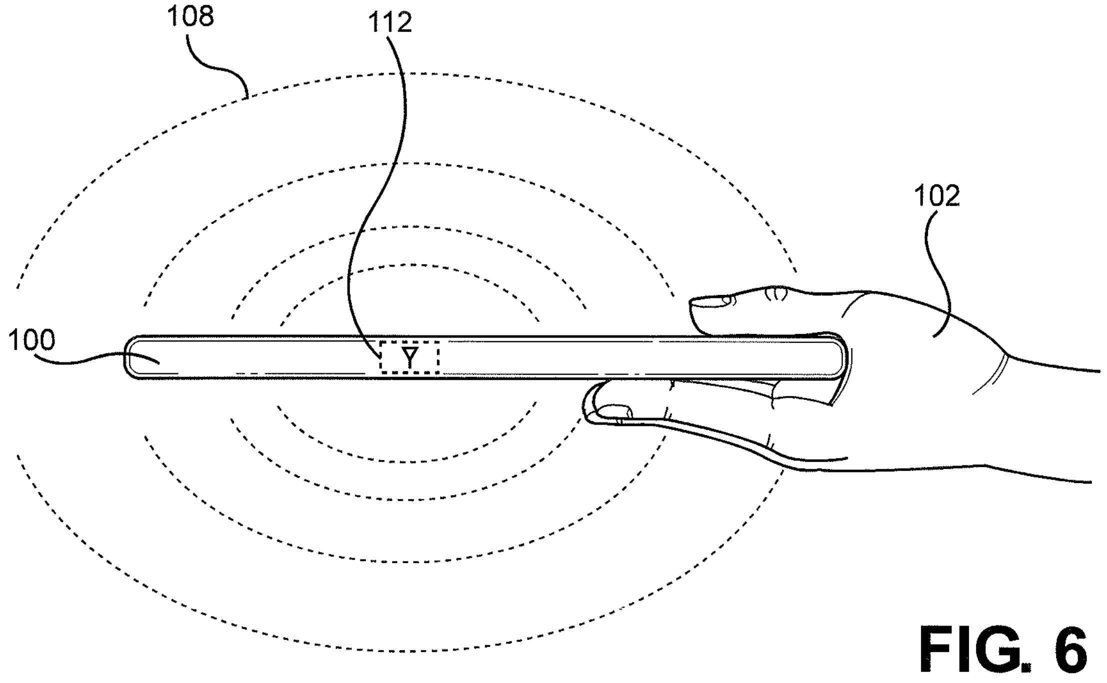
FIG. 6 is a cross sectional view of a tablet PC without the preferred embodiment of FIG. 3 installed, showing an approximation of the electromagnetic field emanating from the antenna of the portable electronic device.

FIG. 6 shows the side view of the same circumstances illustrated by FIG. 5. EMF 108 radiates in all directions from antenna 112 (shown in dashed lines). While EMF 108 radiating from the top of device 100 is directed toward the network communications, EMF 108 radiating from the bottom of device 100 is likely directed at the user 102, especially if the user 102 is seated, as in FIG. 2.

FIG. 7 is a cross section of a preferred embodiment of EMF shield 220 as installed on wireless electronic device 200. In this embodiment of the present invention, EMF shield 220 covers the entire back and all four sides, or edges, of device 200, with curved edges 222. EM radiation 208 continues to radiate from antenna 212 (shown in dashed lines) from the interior of device 200, however, only a mere fraction of EM radiation 208 escapes through EMF shield 220 toward the user, depicted as fewer curved lines than on the top. It is important to note, that device 200 is still capable of providing its intended functionality and communication with desired wireless networks with EMF shield 220 installed. The EMF shield 220 prevents EMF radiation 208 not required for communication that is, the EMF radiation 208 that is radiated in the opposite direction from the desired network antenna or that would never otherwise reach that network, from reaching the user's 202 body. Thus, when user 202 operates device 200 in his or her lap, only a slight fraction of the EM radiation 208 actually emitted from electronic device 200 is experienced by user 202 than would otherwise be present without EMF shield 220. The rest of the EMF 208 is reflected or absorbed by EMF shield 220.

This Figure further shows a preferred embodiment of EMF shield 220 with curved edges 222. Curved edges 222 are employed for the dual purpose of blocking EM radiation 208 radiating from the edges of device 200 from interacting with user 202, and also providing a means for securing EMF shield 220 to device 200. In an alternative embodiment, curved edges are not present in EMF shield 220, or the shielding layer 224 in not continuous through the curved edges 222. These alternate embodiments provide less shielding, yet offer options for designs suiting different EM shielding levels or requirements, and further modify the device's 200 antenna 212 beam pattern. This aspect of the present invention is useful for electronic devices other than an iPad™, with different internal antenna 212 positions and varying RF beam patterns or EMF 208.

Figure 8:
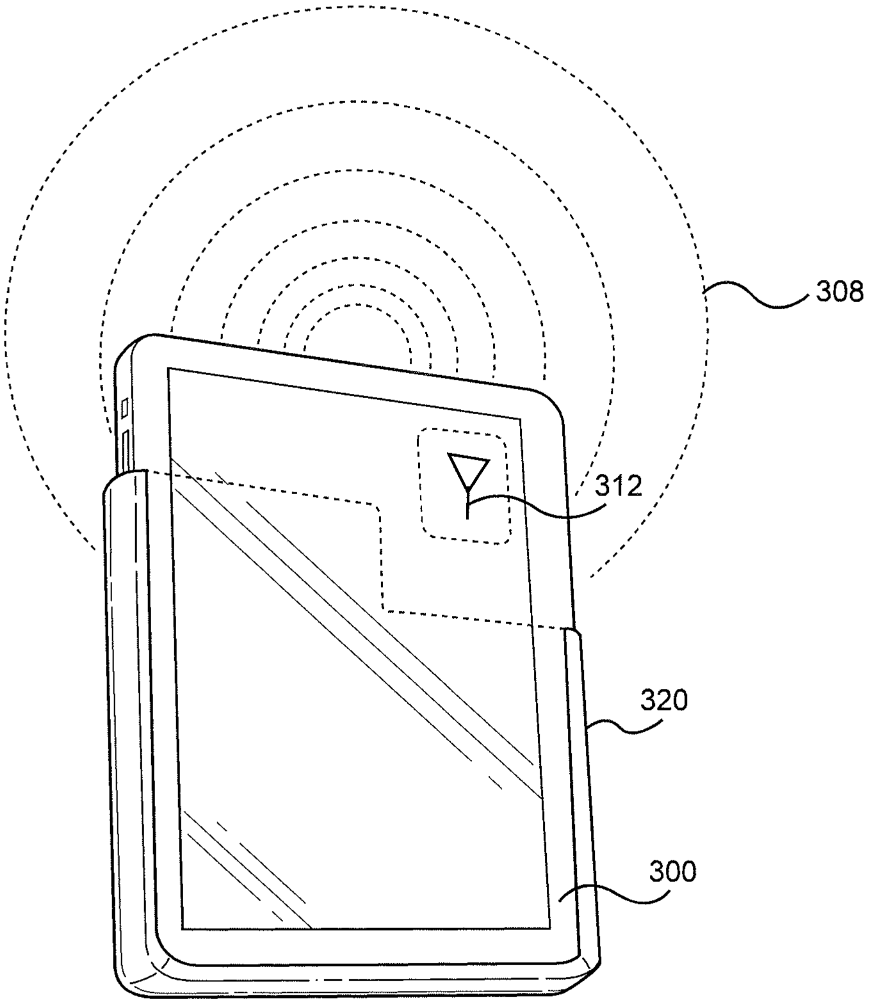
FIG. 8 is a perspective view of an alternative embodiment of the present invention made with a partial covering on the back surface of the portable electronic device, as installed on a portable electronic device, showing a two dimensional approximation of the electromagnetic field emanating from the device.

Referring now to FIG. 8, an alternative embodiment of the present invention is shown as installed on wireless electronic device 300. EM shield 320 is cut to a different shape than EMF shield 220, accounting for different antenna 312 placements within device 300, and for different desired beam patterns for EMF 308. This embodiment of the present invention is useful for wireless electronic devices 300 other than those with a centrally located antenna 212, as in previous Figures.

As discussed above, omnidirectional antennae are often used in small systems for space and cost savings. While a directional antenna 312 is neither practical nor affordable for such a device 300 application, the shielding afforded by EMF shield 320, has a similar effect as a directional antenna might, by altering the beam forming of antenna 312. By constraining the output of the antenna 312 using EM shielding materials, results similar to that of a directional antenna are realized, allowing a customizable RF beam using the shape of the shielding layer 224 within EMF shield 320.

In this Figure, EMF 308 is shown in a two dimensional RF beam approximation that radiates from the top edges of EM shield 320, and out of the face of device 300. The dimensions of EM shield 320 are smaller than EMF shield 220, and block less overall radiation. This variation in EM shield 320 provides an option for better connectivity to desired wireless networks, should the antenna be located in a different place within device 300 than in device 200. This enables the present invention to be customized for many different wireless devices 300.

Figure 9:
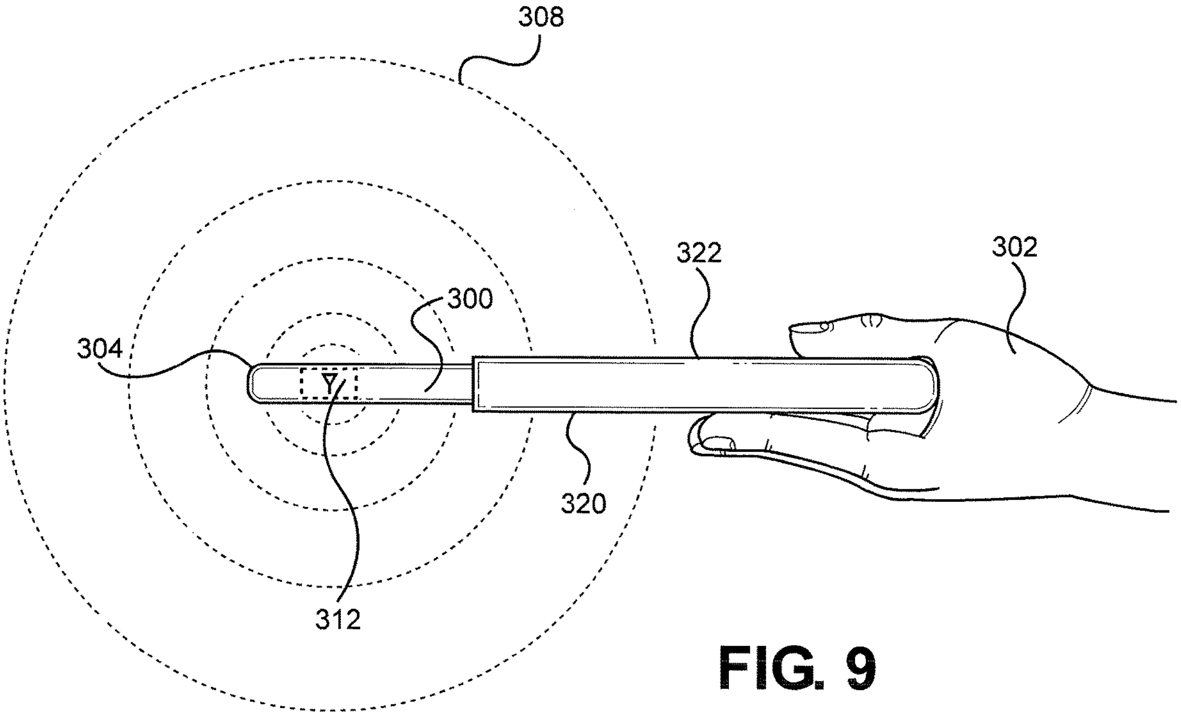
FIG. 9 is a cross sectional side view of the alternative embodiment of FIG. 8 installed on a wireless electronic device showing a two-dimensional approximation of the electromagnetic field emanating from the device.

FIG. 9 is a side view of the alternative embodiment of FIG. 8, showing curved edges 322 wrapping around the sides of device 300, while leaving a portion of the back of device 300 open for unimpeded wireless communications. Where testing or design requires, this alternative embodiment provides options for customizing the amount and nature of the shielding provided to device 300.

The unshielded portion of the back of device 300 is notionally considered to be the top 304 of the device 300. In common use, the top of a wireless electronic device 300 is pointed away from user 302, directing the majority of the radiated EMF 308 away from user 302. A two dimensional approximation of EMF 308 is also shown, blocked where EM shield 320 is employed.

Figure 10:
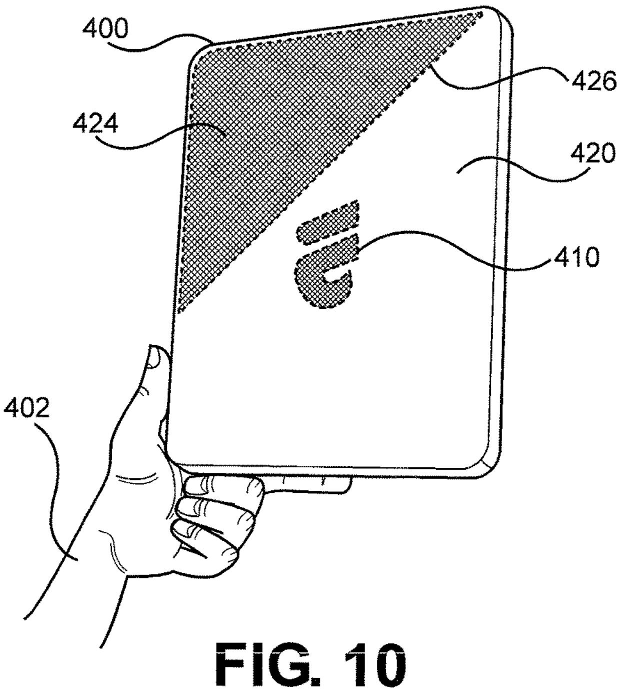
FIG. 10 is a view of the rear of another alternative embodiment of the present invention installed on a wireless electronic device, showing a logo formed into the present invention through removal of the outer layer or replacement of material with a transparent shielding material.

Referring to FIG. 10, the rear of device 400 is depicted, encased in an alternative embodiment of the present invention, making use of the above characteristics. EMF shield 420 has a logo 410 cut into the outer layer 426, revealing the material used in construction of shield layer 424. Dashed lines depict a cutaway of outer layer 426 showing that the same material is formed into the rest of the EMF shield 420, but is visible in the area of logo 410. The area of outer layer 426 cut away to form logo 410 can further be coated in another clear film, replacing outer layer 426, and protecting shield layer 424. Alternatively, a "filled" version of the monel mesh, Porcupine, may further be used, taking advantage of the protective aspects of the elastomeric polymer with which the expanded monel mesh is impregnated.

In an embodiment, portions of all three layers of EMF shield 420—outer layer 426, shield layer 424, and inner layer (not shown)—may be replaced with a transparent material that provides EM shielding in the same manner as the monel mesh or fine copper mesh. Use of a transparent material such a glass, polycarbonate, allycarbonate, acrylic, polyester or similar transparent material, impregnated, formed, or coated with EM shielding materials can be used to form designs such as logo 410 in the EMF shield 420 providing aesthetic options to the manufacturer. Such a transparent material may also have independent shielding characteristics. Logos 410 formed into the EMF shield 420 with the transparent material can then reveal the back of device 400 itself.

In yet another alternative embodiment, the EMF shield of the present invention may be formed with an adhesive layer enabling the adhesive attachment of the shield to the device 400. In such an embodiment, the shield may be provided in a sheet, and the specific shape of the shield may be cut out from the sheet to correspond to the particular device 400 being used. Shield 420 may also be made from other materials, such as leather, without departing from the spirit of the present invention incorporating the various EMF shields described above.

Alternative Embodiment

Figure 11:
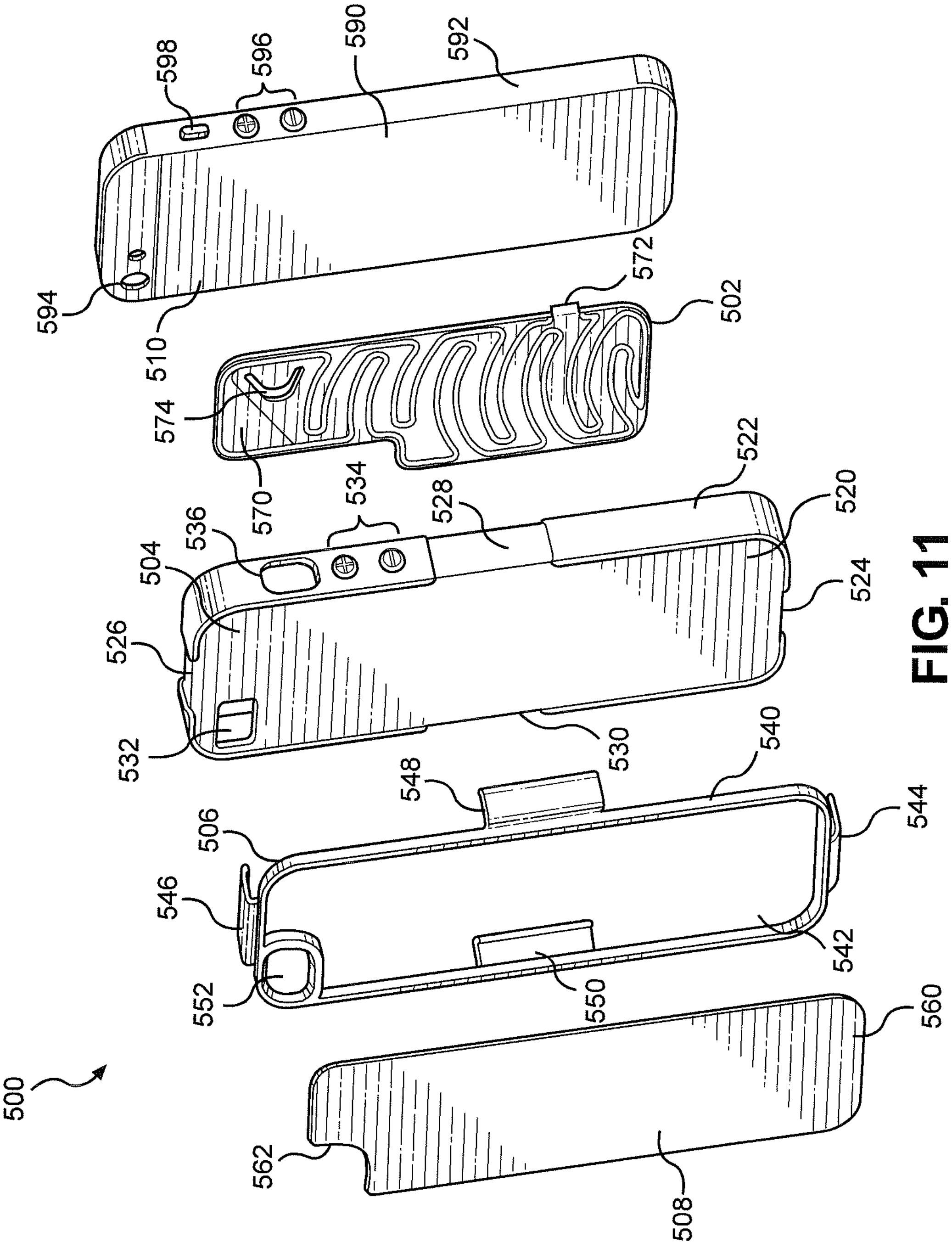
FIG. 11 is an exploded view of an alternative embodiment of the present invention configured to cooperate with a portable cellular telephone and having a case equipped with an electromagnetic redirection panel having a signal capture ring and an integrated ground plane having a grounding tab to establish a grounding connection between the electromagnetic redirection panel and the chassis ground of the portable electronic device.

Referring now to FIG. 11, an exploded view of an alternative embodiment of the present invention is shown and generally designated 500. Alternative embodiment 500 includes an electromagnetic redirection panel 502 insertable into a shock-absorbing inner case 504 having an overclipped external solid outer frame 506 that accepts aesthetic cover inlay 508. A portable electronic device, such as cellular telephone 510, is received in shock-absorbing case 504 to capture the electromagnetic redirection panel 502 such that the redirection panel 502 cooperates with the portable electronic device to capture electromagnetic radiation and redirect the radiation away from the user.

Shock-absorbing inner case 504 is formed with a backing 520 sized approximately the size of device 51*n*, and includes a perimeter frame 522 formed with clip receivers 524, 526, 528 and 530, camera aperture 532, volume pushbuttons 534 and button aperture 536 corresponding with similar features of the electronic device 510. Specifically, camera aperture 532 is positioned adjacent to camera lens 594 on device 510, and pushbuttons 534 are adjacent volume control buttons 596 on device 510, and button aperture 536 is adjacent control button 598.

Overclipped external solid outer frame 506 accepts aesthetic cover inlay 508 to provide various aesthetic options for the user. Outer frame 506 is also formed with a number of mounting clips 544, 546, 548 and 550 which are in positional alignment with the clip receivers 524, 526, 528 and 530, respectively, of inner case 504. In use, clips 544, 546, 548 and 550 are positioned over inner case 504 and a retention force maintains the outer case on inner case 504.

Figure 13:
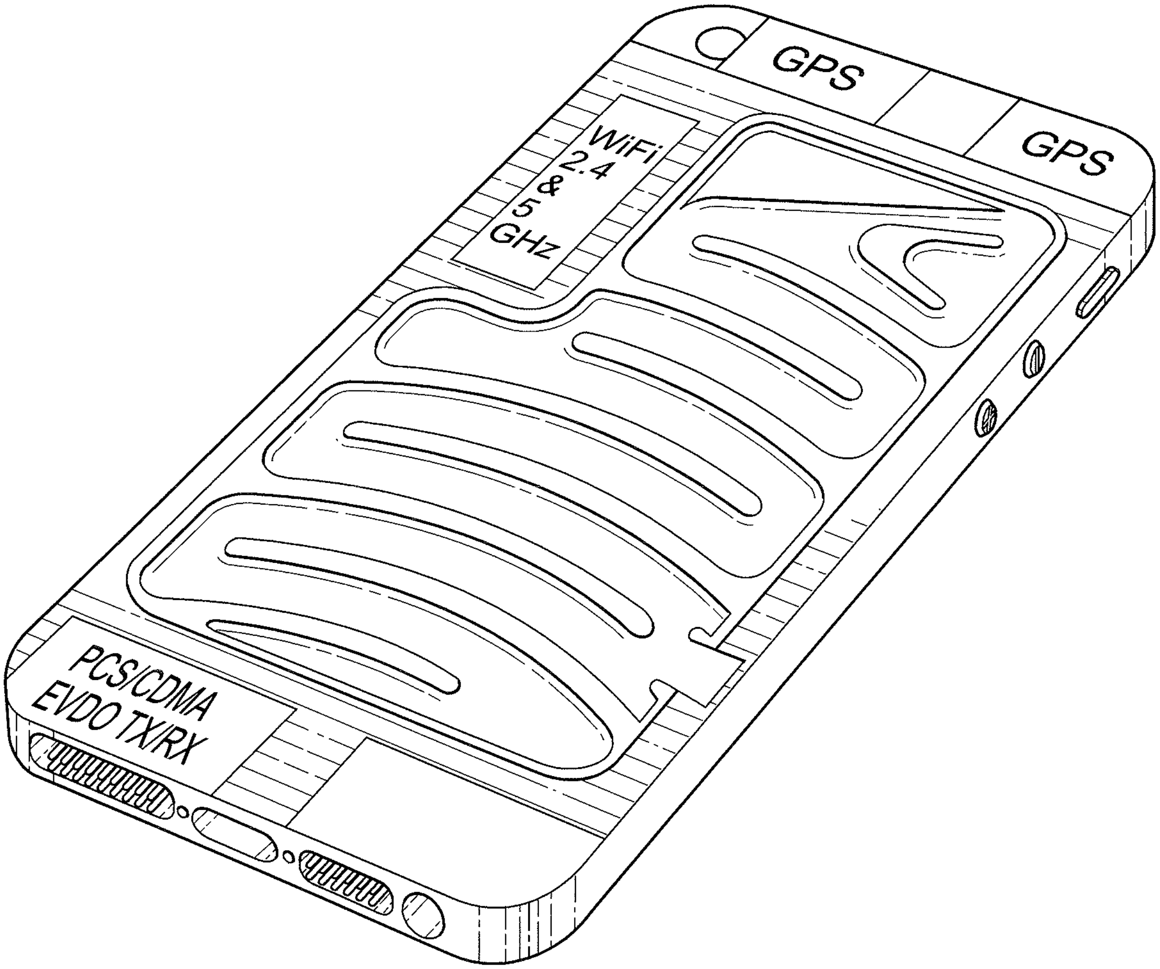
FIG. 13 is a figure of the redirection panel adjacent a wireless device to depict the coverage of certain antenna, and to lack of coverage to other antenna within the wireless device.

Outer frame 506 is also formed with an aperture 552 corresponding to aperture 532 on inner frame to provide visual access to lens 594 of device 510. Outer frame 506 is also formed with an inlay receiving aperture 542 sized to closely and securely receive inlay 508. In order to provide visual access to lens 594, a notch 562 may be formed in inlay 508. As is discussed elsewhere herein, inlay 508 includes a decorative panel 560 which can be provided with various aesthetic features, colors, textures, or other aspects known in the art without departing from the scope of the present invention. FIG. 13 is a figure of the redirection panel adjacent a wireless device to depict the coverage of certain antenna, and to lack of coverage to other antenna within the wireless device.

Figure 12:
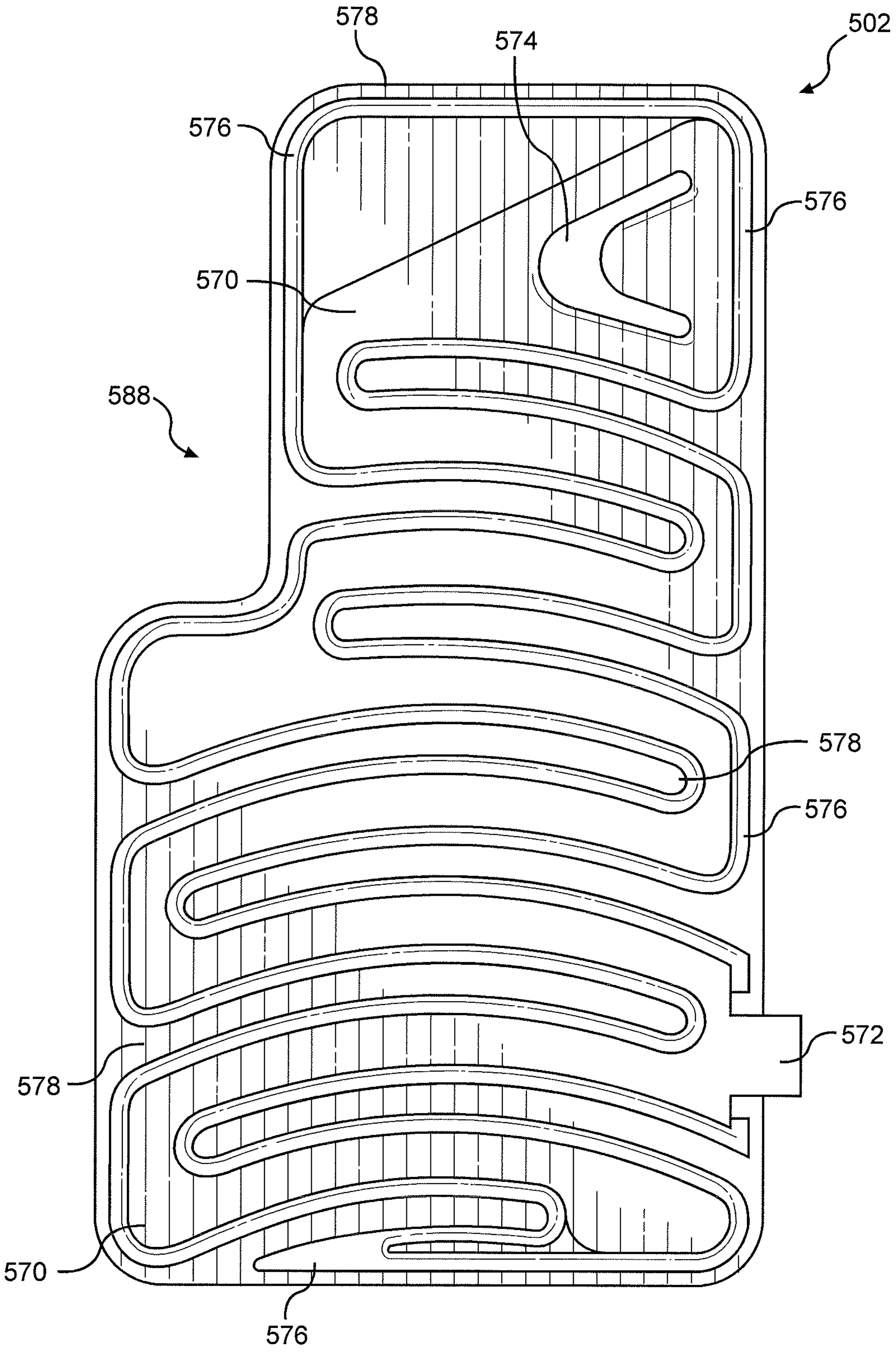
FIG. 12 is a plan view of the electromagnetic redirection panel of the present invention including a ground, or shield plane electrically couplable to the chassis of the portable electronic device, and having a signal capture ring adjacent the antenna integral to the portable electronic device transmitting the selected signal characteristics, and leaving portions of the portable electronic device uncovered adjacent other integral antenna to facilitate communication using non-selected signal characteristics.

Electromagnetic redirection panel 502 is more fully described in conjunction with FIG. 12. FIG. 12 is a plan view of the electromagnetic redirection panel 502 of the present invention and includes a ground plane, or attenuation path 570 which covers substantially the back panel 590 of device 510 to provide an electromagnetic shield. Ground plane 570 includes a ground tab 572 which is electrically couplable to the chassis 592 of the portable electronic device 510. Redirection panel 502 is also equipped with a signal capture ring 576 adjacent the antenna formed integral to the portable electronic device 510 that is transmitting the selected signal characteristics. For instance, when redirecting typical cellular communication signals, redirection panel 502 would include a signal capture ring 576 sized to correspond to the particular antenna transmitting and receiving cellular signals, and leaving portions of the portable electronic device uncovered adjacent other integral antenna to facilitate communication using non-selected signal characteristics, such as by providing a cutout portion 588 adjacent other signal transmitting and/or receiving antenna, such as for WiFi transceivers, or GPS receivers.

This system is designed to protect a wireless device while simultaneously reducing the specific absorbed radiation emitted by the wireless device. Redirection panel 502 is also formed with a re-direction transmitting antenna, or fan, 574. This antenna couplably receives the signals from the capture ring 576 and retransmits the signal in a predetermined direction away from the user. This technique provides for a minimal signal exposure to the user, while simultaneously providing a high level of functional service to the portable electronic device 510.

With reference back to FIG. 11, the functional pieces for the present invention include the redirection panel 502, a shock absorbing inner case, and a solid structural outer case. The aesthetic component is a trim plate 508 which attaches to the external of the outer case 506 for customization. The system is configured such that the radiation emitted from the antennas internal to the wireless device are gathered and redirected through the redirection panel 502. The redirection is accomplished by panel 502 comprised of four specific elements; capture ring 576, a redirection transmitting antenna, or fan 574, a chassis ground connection 572, and shield planes, or dielectric insulation layers 578. The capture ring 576 gathers the radiation produced by the internal antennas on the phone 510 and redirects it in a safer direction away from the user's head and hand via redirection transmitting antenna 574. The redirection transmitting antenna 574 directs the radiation out the side and top of the device resulting in a lower specific absorbed radiation than a device without the redirection panel 502.

The inner case 504 and outer case 506 serve at least two purposes; one is to house the redirection panel 502 and ensure proper connection of the chassis ground connection 572 to the chassis 592 of the wireless device 510, the second is to protect the phone from impact and/or damage resulting from everyday use.

The inner case 504 is made from a shock absorbing low durometer material which will compress and absorb impact in order to prevent impact from transferring to the wireless device 510 and causing damage.

The outer case 506 is made from a solid high durometer material. This component provides clamping pressure and a structural form to mount the inner case 504 and redirection panel 502 to the wireless device 510, and the aesthetic trim plate 508 may be comprised of two materials laminated together. For instance, 560 the backing plate is a solid thermoplastic resin which has features to lock the plate 508 into the outer case 506. The trim plate 508 is made from a variety of materials known in the art to allow a user to customize the look of the wireless device.

The present invention includes the several specific design specifications. Capture ring 576 is made from 0.0625"× 0.010" COPPER, and the attenuation path, or ground plane 570, is made from 1234"×0.010" COPPER. The retransmitting antenna, or redirection transmitting fan 574, includes 0.4983 square inches of surface area in order to tune to the standard cellular range antennas while providing the optimum benefit for retransmitted signal and minimal user exposure to radiation. The grounding tab, or point, 572 is made from 0.1000"×0.035" COPPER, and the shield planes, or dielectric insulation layers 570, are made from a 0.015" POLYAMIDE FILM.

Signal capture ring 576, in a preferred embodiment, has a width of 0.037 inches to most effectively receive all desired radiation from the device 510. Further, the shape of redirection fan 574 may vary from the shape shown in FIGS. 11 and 12, and may be specifically tuned to retransmit the specific frequencies of interest, such as cellular communication signals in the present invention.

It is to be appreciated that the specific mechanical features, and component parts of the present invention may provide specific features for a particular portable electronic device, but it is to be appreciated that specific bandwidth criteria and transmit power requirements may alter the specific form features shown in FIG. 12, which is merely exemplary of a preferred embodiment.

Using the present invention and in accordance the particular criteria described above, simulation results indicated that for cellular signals in the LTE/GSM signal range, an increase of the signal of 29% (4.9 DB) was expected. In the PCS/CDMA/EVDO signal range, an increase of 44% (7.2 DB) was expected. Furthermore, with the cutouts 588 positioned around the various non-cellular signals, the typical WiFi signal having 2.4 GHZ signal was substantially neutral, the 5 GHZ signal was neutral, and the GPS receiver signal was increased by 8% (0.96 DB).

An important factor for the present invention includes the measurements of the sAR output in the rear plane of the device. For instance, using the redirection panel 502 of the present invention, the sAR output from the rear plane decreased by 22%, and the sAR output from the front plane decreased 49%. In short, by inclusion of the redirection panel 502 electrically coupled to the chassis of the device 510, the sAR output from the front plane of the device 510 was cut in nearly one half, thereby reducing the radiation experienced by the user by a factor of 2.

While there have been shown what are presently considered to be preferred embodiments of the present invention, it will be apparent to those skilled in the art that various changes and modifications can be made herein without departing from the scope and spirit of the invention.

What is claimed is:

1. A wireless device accessory for a wireless device having an antenna transmitting wireless signals, comprising:
- a protective case having a redirection panel, wherein the redirection panel comprises:
- a signal capturing ring;
- a dielectric insulation layer sized to correspond to said antenna of said wireless device;
- a ground plane adjacent said signal capture ring;
- a grounding tab extending from said ground plane and outside said signal capture ring to electrically couple to a chassis of a portable electronic device; and
- a redirection antenna located inside, and coplanar with, said ring receiver and electromagnetically coupled to said ring receiver to retransmit said wireless transmissions.

2. The wireless device accessory of claim 1, wherein the ground plane, the grounding tab, and the redirection antenna comprise a conductive material.

3. The wireless accessory of claim 2, wherein the ground plane, the grounding tab, and the redirection antenna are electrically coupled.

4. The wireless device accessory of claim 3, wherein the insulation layer is a dielectric material.

5. The wireless device accessory of claim 3, wherein the ground plane and the redirection antenna are located on the insulation layer.

6. An apparatus for directing radio frequency signals, comprising:
- a wireless device having a cellular antenna configured to transmit wireless signals; and
- a redirection panel positioned adjacent to the wireless device,
- wherein the redirection panel comprises:
  - a dielectric insulation layer sized to correspond to the antenna of the wireless device;
  - a signal capture ring adjacent to the antenna of the wireless device;
  - a ground plane within the signal capture ring;
  - a grounding tab extending from the ground plane and outside the signal capture ring to contact the wireless device; and
  - a redirection antenna formed within the ground plane and located inside and coplanar with the signal capture ring and configured to retransmit wireless transmissions captured by the signal capture ring.

7. The apparatus for directing radio frequency signals of claim 6, wherein the redirection panel comprises a cutout portion configured to be adjacent to antennas other than the cellular antenna.

8. The apparatus for directing radio frequency signals of claim 6, wherein the captured and retransmitted wireless transmissions consist of cellular signals.

9. The apparatus for directing radio frequency signals of claim 6, wherein the grounding tab is configured to electrically couple to a chassis of the wireless device.

10. The apparatus for directing radio frequency signals of claim 6, wherein the redirection antenna comprises a shape tuned to retransmission of frequencies of the wireless transmissions of the cellular antenna.

11. The apparatus for directing radio frequency signals of claim 6, wherein the dielectric insulation layer comprises polyamide film.

12. The apparatus for directing radio frequency signals of claim 11, wherein the signal capture ring, ground plane, and grounding tab comprise copper.

* * * * *